E. A. THOMPSON.
MAGNIFYING INSTRUMENT.
APPLICATION FILED APR. 23, 1915.
1,148,550.
Patented Aug. 3, 1915.
2 SHEETS—SHEET 1.
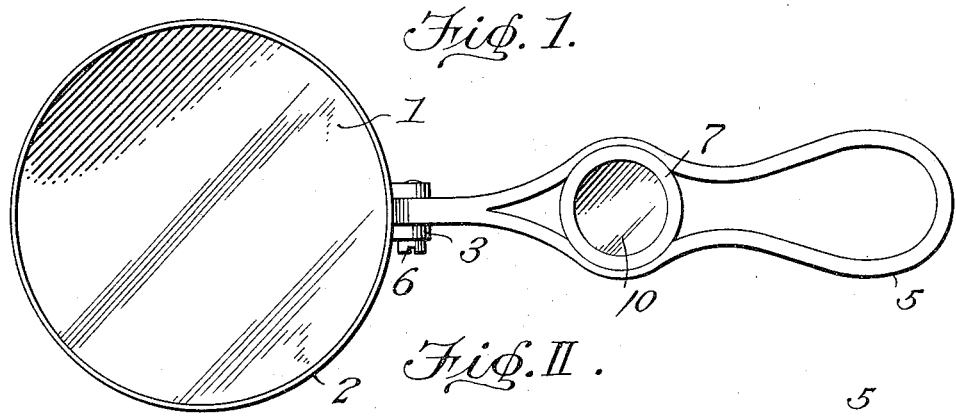
Fig. 1.
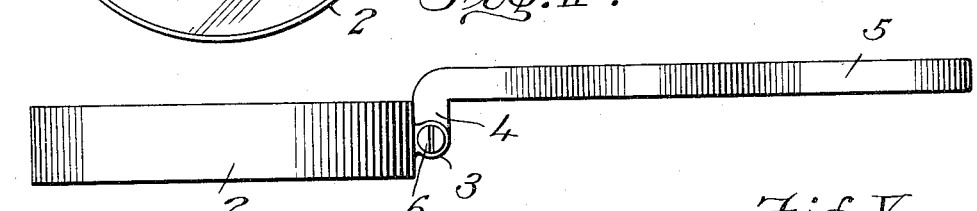
Fig. II.
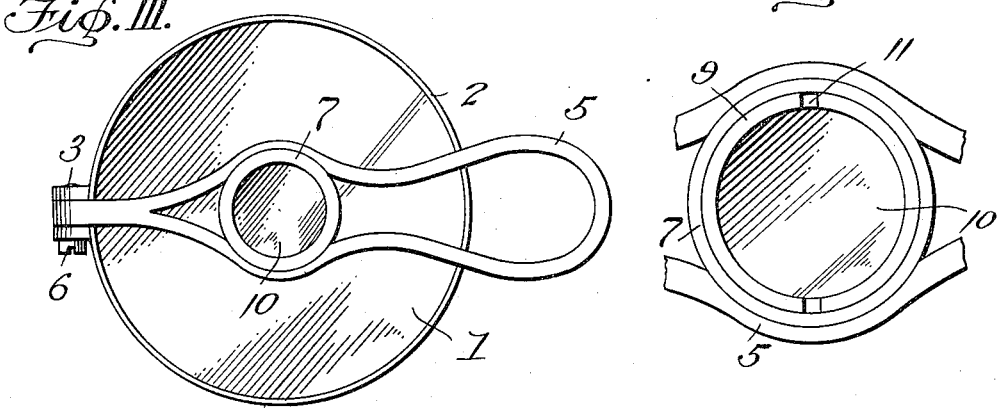
Fig. III. Fig. V.
Fig. IV. Fig. VI.
WITNESSES:
Joseph J. Desmers
Carroll Dailey
INVENTOR
Edmund A. Thompson,
BY
H. H. Styll & H. H. Parsons
ATTORNEYS E. A. THOMPSON.
MAGNIFYING INSTRUMENT.
APPLICATION FILED APR. 23, 1915.
1,148,550.
Patented Aug. 3, 1915.
2 SHEETS—SHEET 2.
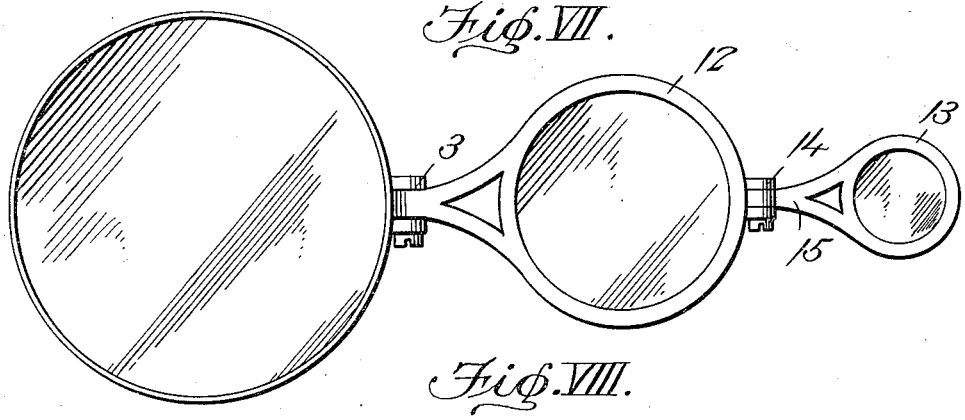
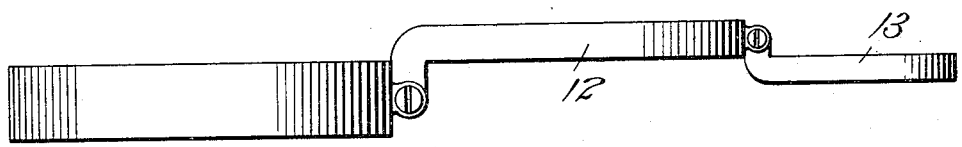
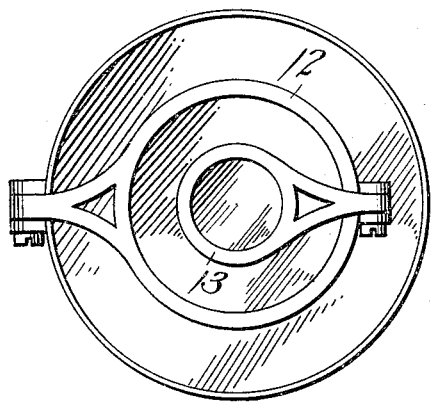
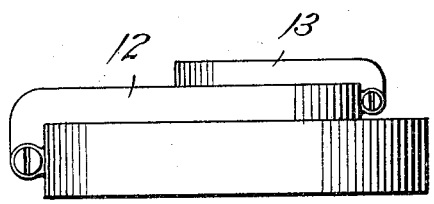
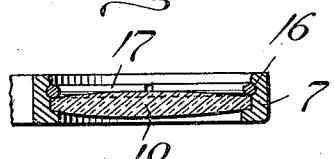
WITNESSES:
Joseph J. Demers
Carroll Bailey
INVENTOR
Edmund A. Thompson,
BY
H. H. Styll + H. K. Parens
ATTORNEYS

UNITED STATES PATENT OFFICE.

EDMUND A. THOMPSON, OF AMHERST, MASSACHUSETTS.

MAGNIFYING INSTRUMENT.

1,148,550.  Specification of Letters Patent.  Patented Aug. 3, 1915.

Application filed April 23, 1915. Serial No. 23,323.

*To all whom it may concern:*

Be it known that I, EDMUND A. THOMPSON, a citizen of the United States, residing at Amherst, in the county of Hampshire and State of Massachusetts, have invented certain new and useful Improvements in Magnifying Instruments, of which the following is a specification.

This invention relates to magnifying instruments and has particular reference to pocket magnifying glasses.

The primary object of the invention is to provide an instrument of this character which is so constructed that the focal strength of the magnifying glass may be varied to suit the individual requirements of its user.

The invention contemplates the provision of an ordinary magnifying glass, the frame of which is provided with a folding handle carrying auxiliary lenses, the handle being adapted to be folded over the glass to position one or more of the auxiliary lenses thereover in order to increase the focal strength, and it is another object of the invention to provide novel means for mounting the auxiliary lenses in the handle.

With the foregoing and other objects in view, the invention consists in the novel features of construction, combination and arrangement of parts, as will be hereinafter more fully described, illustrated in the accompanying drawings, and claimed.

In the drawings: Figure I is a plan view of the improved magnifier showing the handle in opened position. Fig. II is a side elevation. Fig. III is a plan view showing the handle in folded position. Fig. IV is a side elevation of the magnifier with the handle in folded position. Fig. V is a fragmentary plan view of the under portion of the magnifier showing the manner in which the auxiliary lenses are mounted therein. Fig. VI is a central longitudinal sectional view through the structure illustrated in Fig. V. Fig. VII is a plan view of a modified form of magnifier. Fig. VIII is a side elevation of the modification shown in Fig. VII. Fig. IX is a plan view showing the folded position of the modified form of magnifier. Fig. X is a side elevation of the modified form of magnifier in folded position. Fig. XI is a fragmentary longitudinal sectional view through a portion of the handle showing a slightly modified form of means whereby the auxiliary lenses are secured therein.

Referring to the drawings by numerals, 1 designates an ordinary magnifying glass which is mounted in any preferred manner within a frame 2 provided therefor, said frame being provided intermediate its upper and lower edges and upon the outer face thereof with a pair of spaced lugs 3 between which the offset portion 4 of the handle 5 is pivotally mounted, a screw 6 being passed loosely through one of the lugs through an opening in the offset portion 4 and threaded in the other lug, whereby the handle is pivotally mounted upon the frame and whereby the frictional engagement between the handle and frame may be varied so as to readily permit the handle to support the lens in longitudinal alinement therewith when the handle is in opened position.

The handle 5 is extended at right angles from the offset portion 4 and has the lower edge thereof spaced a suitable distance from the pivot point of the portion 4 so that when the handle is swung to a closed position, as illustrated in Fig. IV of the drawings, the lower edge of the handle will lie flush with the edge of the lens frame 2. The handle 5 is divided and separated a suitable distance from the portion 4, as clearly illustrated in Figs. I and III of the drawings, and mounted between the divided portion and secured therebetween in any suitable manner, as by soldering or welding, is a socket 7. This socket 7 is provided with an inwardly extending flange 8 adjacent one edge thereof, and the inner face of the socket from the inner face of the flange 8 to the opposite face or edge of the socket is screw-threaded to receive the externally screw-threaded clamping member 9. A lens 10, preferably of a power different from the power of the lens 1 is seated upon the flange 8 and the clamping member 9 is then threaded into the socket 7 so that the lower face thereof will engage the edge of the lens to firmly clamp the same within the socket, a suitable number of recesses 11 being formed in the outer edge of the member 9 in order to provide means whereby a tool may be readily engaged therewith to facilitate the threading operation of the member within the socket.

Taking the pivot point of the handle 5 upon the frame 2 as a center, it will be noted that the lens 10 is positioned a suitable distance from said pivot point so that when the handle is swung to a closed position, as illustrated in Fig. III of the drawings the center of the lens 10 will lie directly over the center of the lens 1, so that the magnifying power of the instrument will be greatly increased. By providing the lens 10 of greater or less power than the lens 1 it will be noted that the user of the instrument may use either lens singly or may use the combined lenses, as set forth, it being readily apparent that the individual requirements of different users of the instrument are provided for.

While the structure herein shown and described is considered as being the best and preferred form of my invention, I wish to have it understood that various modifications may be made without departing from the spirit of the invention, one desirable modification being illustrated in Figs. VII, VIII, IX and X of the drawings.

In Fig. VII of the drawings, instead of providing a handle 5 with a lens mounted therein, I form the handle by providing a pair of auxiliary lens frames 12 and 13, the larger of which, 12, is pivotally mounted between the lugs 3 in the ordinary manner and has the outer edge thereof diagrammatically opposite from the pivot point of this lens with the lens frame 2 provided with a pair of lugs 14 between which is pivoted the offset portion 15 of the frame 13. Each of the frames 12 and 13 carries lenses therein preferably of different powers, and the distance between the pivot point of the lens 13 with the lens 12 and the center of the lens 12 with respect to the center of the lens 1 is in the same proportion as set forth with respect to the structure illustrated in Fig. 1 of the drawings, so that the lens 13 may be swung over the lens 12, the lens 12 may be swung over the lens 1, or the entire series of lenses may be swung into folded position, as clearly illustrated in Fig. IX of the drawings. By this construction it will be readily apparent that the range of the power of the lenses may be varied and that an instrument has been provided which will suit the requirements of all persons who make use of magnifying glasses.

In Fig. XI of the drawings, a slightly modified form of means has been provided for holding the lens 10 within the socket 7. In this form of the invention instead of providing the screw-threaded member 9 for clamping the lens within the socket, I provide the inner face of the socket with a semi-circularly shaped groove 16 and provide an expansible split ring 17 for engagement with said recess so that when the lens is seated upon the flange 8 the ring may be pressed down upon the upper edge of the lens whereby it will spring in the recess 16 and thus firmly clamp the lens within the socket.

It will be noted that the offset portion 4, besides permitting the handle to fold upon the edge of the frame, serves as an abutment for engagement with the sides of the frame when the handle is in open position to prevent accidental folding of the lens frame upon the handle, during use of the instrument. It will also be noted that the handle is of a length to overlie the edge of the frame when the handle is in a folded position so that the overlapping portion may be utilized as a handle for the lenses when in this position.

From the foregoing description taken in connection with the accompanying drawings it is thought that the construction and operation of the device will be clearly understood, and while I have herein shown and described one preferred form of my invention, I do not wish to be limited thereto except to such limitations as the claims may import.

I claim:

1. A magnifying instrument including a lens, a frame, a handle pivotally mounted on said frame, and a lens mounted on said handle in such a position as to overlie the first mentioned lens when the handle is folded.

2. In a magnifying instrument, a lens frame, a handle pivoted thereto, a socket carried by said handle, a lens mounted in said socket, and a member for clamping said lens in said socket.

3. In a magnifying instrument, a handle pivotally mounted on a lens frame, and a lens carried by said handle, said lens being mounted on said handle in such a position that the center of the lens will positively aline with the center of the lens frame when the handle is in a folded position.

4. In a magnifying instrument, the combination with a lens supporting member, of a handle pivotally connected thereto, a lens carried by said handle, said handle being of a length to overlie the edge of the supporting member when the lenses are in folded position.

5. In a magnifying instrument, the combination with a lens, of a second lens pivotally mounted on said first lens, and a third lens pivotally mounted on said second lens at a point diagrammatically opposite from the pivot point of the first lens.

6. In a magnifying instrument, the combination with a lens frame, of a second frame pivotally mounted thereon in such a manner that folding movement in one direction is limited, and a third frame pivotally mounted on said second frame for a folding relation thereto in a direction opposite to direction of folding of the second lens upon the first lens whereby all of the lenses may be folded in compact form one upon the other.

In testimony whereof I affix my signature in presence of two witnesses.

EDMUND A. THOMPSON.

Witnesses:
CHARLES F. POWERS,
ALBERT C. MCCLOUD.

Copies of this patent may be obtained for five cents each, by addressing the "Commissioner of Patents, Washington, D. C."